United States Patent [19]
Hatano et al.

[11] 3,764,997

[45] Oct. 9, 1973

[54] INPUT DEVICE

[75] Inventors: Isao Hatano, Kyoto; Isao Mubuchi, Osaka, both of Japan

[73] Assignee: Omron Tateisi Electronics Co., Kyoto-shi, Kyoto-fu, Japan

[22] Filed: Jan. 20, 1972

[21] Appl. No.: 219,350

[30] Foreign Application Priority Data

Jan. 23, 1971 Japan .................................. 46/2077

[52] U.S. Cl. ............................................ 340/172.5
[51] Int. Cl. ............................................ G11c 19/00
[58] Field of Search .................................. 340/172.5

[56] References Cited

UNITED STATES PATENTS

| | | | |
|---|---|---|---|
| 3,292,764 | 12/1966 | Midgette et al. | 340/172.5 UX |
| 3,470,539 | 9/1969 | Proud, Jr. et al. | 340/172.5 UX |
| 3,540,004 | 11/1970 | Hansen | 340/172.5 |

*Primary Examiner*—Paul J. Henon
*Assistant Examiner*—Paul R. Woods
*Attorney*—Craig, Antonelli & Hill

[57] ABSTRACT

In an input device for use in an electronic computer or the like, it is preferred to transfer the informations fed from a plurality of the information sources to the following stages at the predetermined periods, and in the event that two or more informations are applied to the input device simultaneously in an overlapped condition, it is necessary to transfer each of the informations independently to the following stages to prevent erroneous operations. In accordance with the input device of the present invention, an information signal fed from a selected one of a plurality of the information signal sources is stored in a shift register, on the other hand, the subsequent information signal is prohibited from entering to the shift register while the former information signal is stored in the shift register, and the information signal thus stored in the shift register can be read out at a predetermined period convenient to the following stages.

5 Claims, 7 Drawing Figures

INPUT DEVICE

Figure 1A:
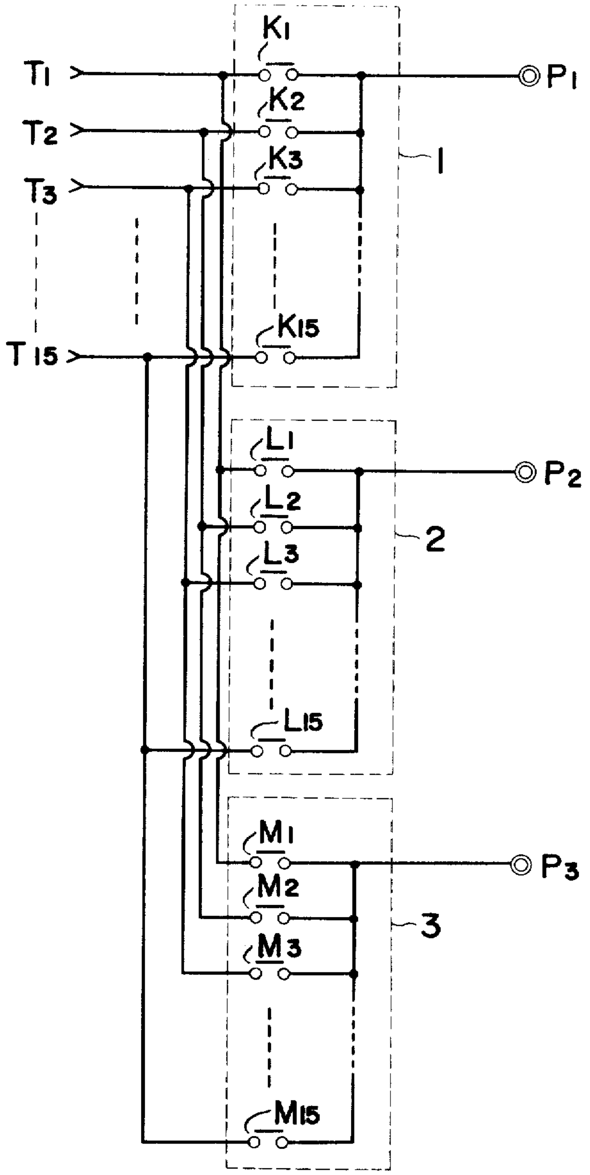

The present invention relates to an input device for use in an electronic apparatus and, more particularly, to an input device for use in an electronic computor or the like being capable of transferring correctly a series of the signals selectively fed from a plurality of signal sources to a following stage.

In a conventional input device for use in an electronic calculator having a plurality of character keys, a signal corresponding to a depressed key such as a numeral key is encoded into binary coded decimal signals and fed to a calculation circuit. In such input device as above mentioned, it is necessary that the signals thus entered should be transferred to the calculation circuit while the key is in the operated position.

On the other hand, there has been proposed an input device for use in an electronic calculator wherein these key switches are divided into a plurality of groups to which a series of the digit timing pulses are applied to each key switch in order to decrease the number of the terminals for connecting between the key switches and input circuits. In such proposed device, decrease of the number of terminal pins employed in a LSI (Large Scale Integrated circuit) which is employed for the input circuit advantageously results in reduction of the manufacturing cost.

However, in such input device of the above mentioned type, there are some disadvantages that the signals associated with each key switch are applied to the calculation circuit at various timings different from each other so that the process and circuit for applying the signals to the calculation circuit is much complicated, and erroneous operation occurs often in arithmetic steps.

In the input device according to the prior art, there is another disadvantage as hereinafter described. In attempt to speed up the calculation with the use of an electronic calculator, two or more keys on the keyboard are sometimes rapidly depressed in succession. Such condition of operation is generally referred to as "two key roll-over" in the case where two keys are involved. During this roll-over operation, it often occurs that contact circuits associated with relevant two keys on the keyboard are synchronously completed for a certain period of time despite of the fact that these keys are successively depressed in a rapid sequence. This roll-over operation has heretofore constituted a cause for miscalculation in the electronic calculator and, accordingly, there has been recently proposed an electronic calculator wherein the provision has been made for preventing the miscalculation or erroneous calculation which may result from the roll-over operation.

However, in such proposed electronic calculator, there still remain a disadvantage in that, in the event that during depression of one key another key is depressed and released, an input signal indicative of the depression of the first operated key is unnecessarily impressed on the following stage of the calculator circuitry such as an arithmetic calculation unit. Accordingly, unless otherwise the first operated key is released before the release of the subsequently operated key, an erroneous calculation is performed by the calculator.

Accordingly, an essential object of the present invention is to provide an input device for use in an electronic device having a new circuit arrangement wherein the above mentioned disadvantages inherent in the conventional input device of the kind have substantially been eliminated.

Another specific object of the present invention is to provide a key input device for use in an electronic computer capable of correctly transferring input signals entered from key switches associated with the character keys disposed on the keyboard to the following stage during a predetermined period which is convenient to the following stages.

A further object of the present invention is to provide an input device for use in an electronic computer or the like which can be applicable to the input circuit which is composed of LSI.

A further object of the present invention is to provide an input device for use in an electronic computer or the like capable of preventing the erroneous transference of the input signals entered from the key switches to the following stage in the event that two or more of the keys on the keyboard are operated to simultaneously complete respective contact circuits for a certain period of time.

In accordance with the present invention a register is provided to store the signal entered from a selected one of signal sources, means are provided to read out the contents of the register at the specified timing to transfer the contents to the following stage and an inhibit circuit prohibits the application of the succeeding signals to the register until the read-in operation of the contents once stored in the rgister to the following stage has finished.

Figure 1B:
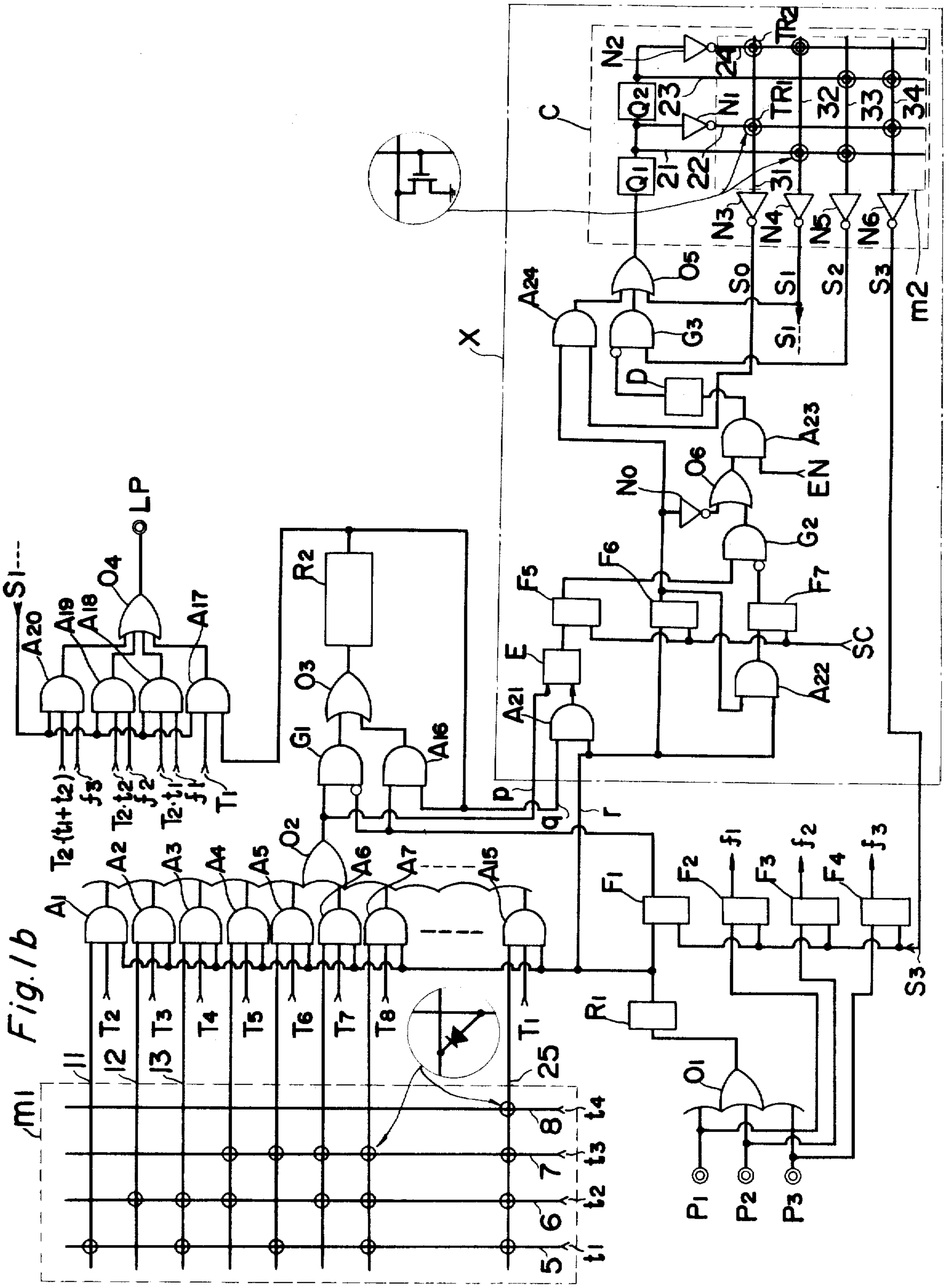
Figure 2:
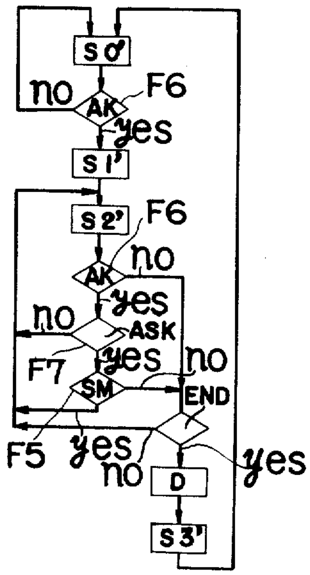
Figure 3:
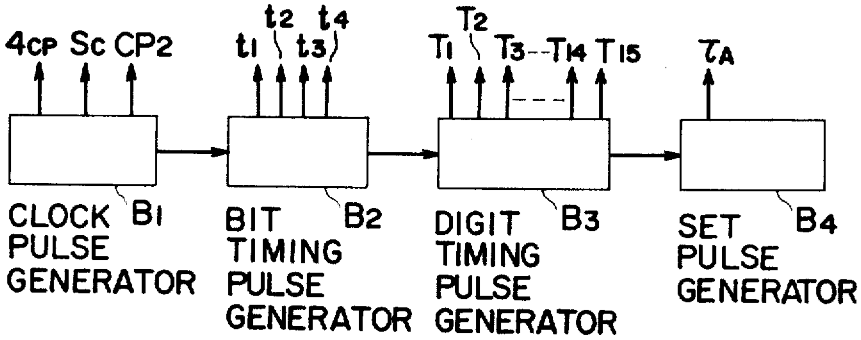
Figure 4:
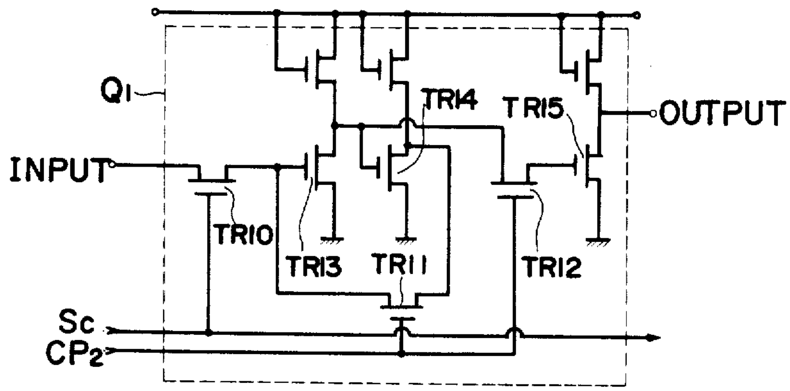
Figure 5:
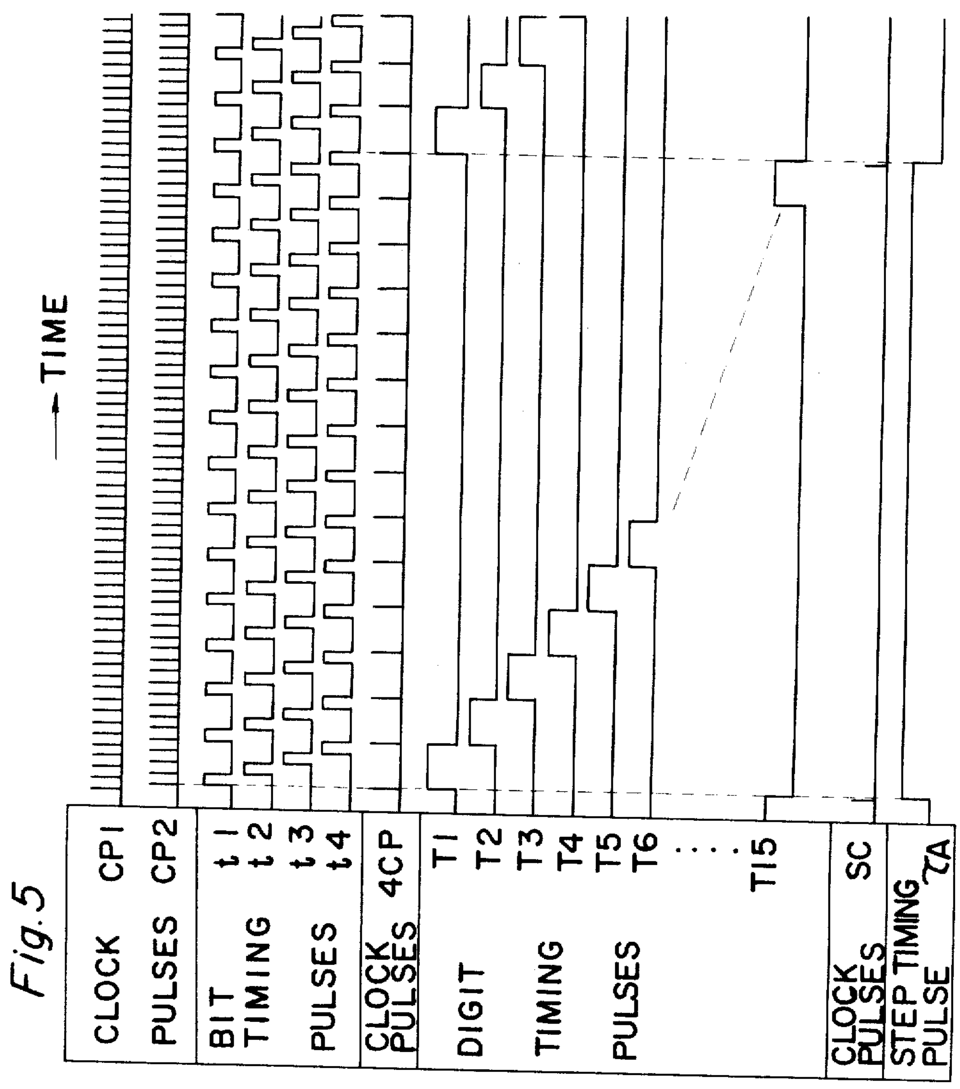
Figure 6:
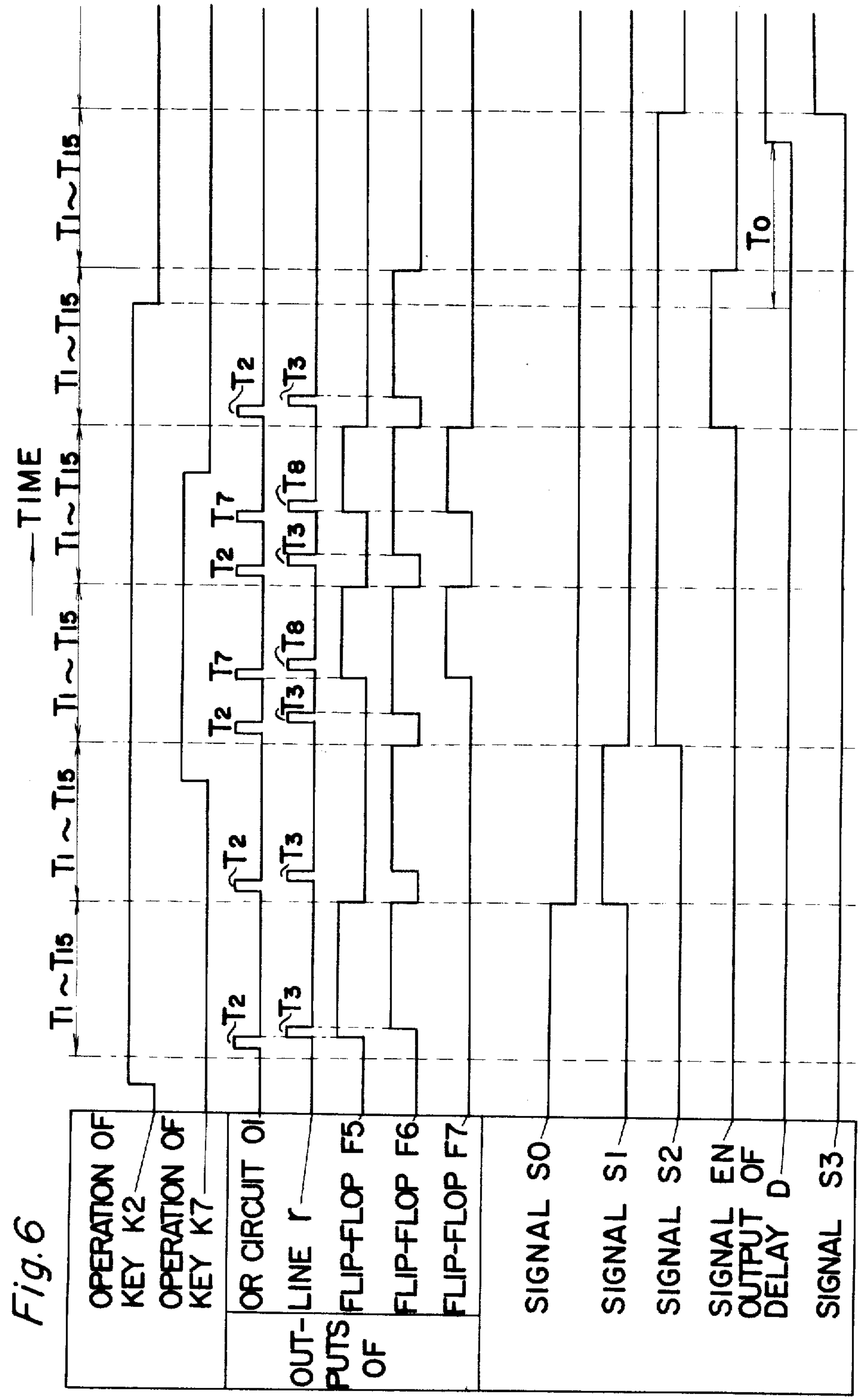

These and other objects and features of the present invention will become apparent from the description taken by way of example in conjunction with a preferred embodiment of the present invention with reference to the accompanying drawings in which ;

FIG. 1 is divided into FIG. 1*a* and FIG. 1*b*, the former showing a circuit of the key switches, and the latter showing an embodiment of a circuit of the input device according to the present invention, FIG. 2 is a flow chart of the parts of the circuit shown in FIG. 1*b*, FIG. 3 is a block diagram of the timing pulse generators employed in the present invention, FIG. 4 is a circuit diagram showing a detailed construction of the flip-flop circuit employed in the embodiment of the present invention, FIG. 5 shows various wave forms of a timing signals employed in the present invention, and FIG. 6 is a diagram showing various wave forms of pulses employed for the illustration of the operations of the essential portions of the circuits shown in FIGS. 1*a* and 1*b*.

FIG. 1*a* shows a connection diagram of circuit arrangement of the key switch contacts operably associated with the respective character keys disposed on the keyboard of an electronic calculator.

Reference numerals K1 through K15, L1 through L15 and M1 through M15 are the key contacts respectively.

These key switch contacts are divided into three groups 1, 2 and 3, which each one end of the key contacts K1 through K15, each one end of the key contacts L1 through L15 and each one end of the key contacts M1 through M15 are respectively connected to common points P1, P2 and P3, and in turn the other end of each key contact K1 through K15, L1 through L15 and M1 through M15 is adapted to receive digit timing pulses T1 through T15 in specified order, each of which is employed for operating the figure indicating units, respectively.

With the circuit arrangement as shown in FIG. 1*a*, the number of the junctions necessitated between the output terminals of the key switches to input lines of the input circuit is advantageously reduced, so that, in the case the input circuit is composed of a LSI, the manufacturing cost may be reduced.

The digit timing pulses T1 through T15 are adapted to be generated by the timing pulse generator B3 shown in FIG. 3 in the specified order, successively, during one step pulse of $\tau a$ as shown in FIG. 5. It is to be noted here that the pulse length of each of the digit timing pulses T1 through T15 corresponds to the sum of bit timing pulses t1, t2, t3 and t4 each of which represents a binary coded signal of $2^0$, $2^1$, $2^2$ and $2^3$ position, respectively. In this embodiment, it is assumed that the digit timing pulses are 15 in number for the sake of simplification of the description.

The number of the digit timing pulses is within 15 or less, since the signal from a matrix ml, which is described later, is a four-bit binary signal. However, it is noted that, in general, the number of the digit timing pulses may be properly selected depending upon the number of the indicating units employed for.

In addition, the number of the key groups is not limited to the embodiment, but can be determined depending upon the number of the keys required for and/or the number of the digit timing pulses provided in the calculator.

Referring to FIG. 1*b*, an input terminal of a register R1 is connected with an output terminal of an OR circuit 01 of which three input terminals are connected with input terminals P1, P2 and P3 of the input device according to the present invention. The input terminals P1, P2 and P3 are respectively connected with said common points P1, P2 and P3 shown in FIG. 1*a*.

The register R1 is composed of a delayed flip-flop circuit of which delay period is equal to one period of the digit timing pulse T1, T2 . . . . or T15, so that the output of the register R1 is delayed for one pulse period of the digit timing pulse in response to the application of the input signal to the register R1. This register is employed to prevent the influence which may result from the distortion of the wave form of the input signals.

The output terminal of the register R1 is connected with each of first input terminals of AND circuits A1 through A15 and also connected with a set terminal of a flip-flop circuit F1. Each of second input terminal of each AND circuit A1 through A15 is connected with each output terminal 11 through 25 of encoder matrix ml of which constructions and operations will be hereinafter described.

Each of third input terminal of each AND circuit A1 through A15 is adapted to receive the digit timing signals T2 through T15 and T1, respectively, in specific order. However, it is noted that the register R1 may be omitted if distortion of the input pulses are negligible. In this case the digit timing pulses T1 through T15 should be applied to the input terminals of the AND circuits A1 through A15, respectively.

Said encoder matrix ml has four input terminals which receive the bit timing pulses t1, t2, t3 and t4, respectively. In the encoder matrix ml respective symbol ⊕ shows the presence of a diode or field effect transistor between the input line 5, 6, 7, 8 and the output line 11, 12 . . . . 25, so that, for example, at the output line 11 a binary coded signal represent the decimal number of "1" namely [0001] can be obtained, and at the terminal 25 a binary coded signal [1111] can be obtained.

The output terminals of the AND circuits A1 through A15 are connected with the input terminal of the inhibit circuit G1 through the OR circuit 02. The set output of the flip-flop circuit F1 is connected with the inhibit input terminal of the inhibit circuit G1, and also, connected with a first input terminal of an AND circuit A16. The flip-flop circuit F1 is employed for storing the signal representative of the depression of any one of the character keys of the keyboard. The outputs of the inhibit circuit G1 and the AND circuit A16 are connected with the input terminal of a register R2 through the OR circuit 03. The register R2 is a serial type shift register which is composed of four bits portions. The output terminal of the register R2 is connected with a second input terminal of the AND circuit A16, and also connected with a first input terminal of an AND circuit A17.

The register R2 is employed for storing character key signals, which represent a character key that has been depressed, obtainable from the matrix ml via any one of the AND circuit A1 through A15, the OR circuit 02, the inhibit circuit G1 and the OR circuit 03. The contents of the register R2 are adapted to be recirculated through the circuits composed of the AND circuit A16 and the OR circuit 03 so that the contents thereof can be stored in the register R2.

Set input terminals of flip-flop circuits F2, F3 and F4 are respectively connected with the terminals P1, P2 and P3 in specified order, so that the flip-flop circuit F2 is set upon receipt of the signal at the terminal P1 ; the flip-flop circuit F3 is set upon receipt of the signal at the terminal P2 ; the flip-flop circuit F4 is set upon receipt of the signal at the terminal P3. These flip-flop circuits F2 through F4 are adapted to store the signals which represent the group 1, 2 and 3 to which the depressed key belongs. The set output terminals f1, f2 and f3 of the flip-flop circuits F2 through F4 are respectively connected with each of first input terminal of AND circuits A18, A19 and A20. the first input terminal of AND circuit A17 is connected with the output terminal of the register R2. Each of second input terminal of each AND circuit A17 through A20 is adapted to receive a command signal S1 which can be generated when the contents of register R2 are transfered to the calculation circuits (not shown).

The third input terminal of the AND circuit A17 is adapted to receive the digit timing signal T1, and respective third input terminals of the AND circuits A18 through A20 are adapted to receive the timing signals $T2 \cdot t1$, $T2 \cdot t2$ and $T2 \cdot (t1+t2)$ in specified order. However, it is to be noted that the timing signal $T2 \cdot t1$ is a bit timing signal t1 generated during the duration of digit timing signal T2, $T2 \cdot t2$ is a bit timing signal t2 during the duration of T2, and $T2 \cdot (t1+t2)$ is the bit timing signals t1 and t2 during the duration of T2.

The outputs of the AND circuits A17 through A20 are connected with an input terminal of a calculation circuit (not shown) through an OR circuit 04 and a terminal LP.

The output terminal *p* of the OR circuit 02 is connected with an input terminal of an EXCLUSIVE-OR circuit E, while the output lines *q* of the register R2 and the output line r of the register R1 are connected with input terminals of an AND circuit A21 of which output terminal is connected with another input terminal of said EXCLUSIVE-OR circuit E.

A portion surrounded by the chain line X is the circuits for generating and controlling the command signal S1 which is employed to read out the contents of the register R2, and the command signal S3 which is employed to reset the flip-flop circuits F1 through F4 so as to clear the application of the inhibit signal for allowing the application of the character key signals to the register R2.

Reference characters F5, F6 and F7 denote flip-flop circuits, respectively. The output terminal of the EXCLUSIVE-OR circuit E is connected with the set input terminal of the flip-flop circuit F5, and in turn the set output terminal thereof is connected with the input terminal of the inhibit circuit G2.

With these arrangements, the signals on the line *r* are the contents stored in the register R1, and output of the AND circuit A21 is the AND logic between the outputs of register R1 and outputs of OR circuit 02. Accordingly, the coincidence occurs with both inputs of the EXCLUSIVE-OR circuit E and of which output becomes [0], since the signal on the line *p* and outputs of the AND circuit A21 are equivalent.

On the other hand, in the event that two relevant keys are simultaneously operated in succession, the contents stored in the register R2 which corresponding to the former key can be obtained at the outputs of the AND circuit A21 during the signal corresponding to the key operated later is produced. This is because the signal on the line *r* which represents the depression of the latter key is applied to the input of the AND circuit A21. In this case, the signal on the line p and the output of the AND circuit A21 are different from each other, since the signals on the line p are equivalent to the contents of the latter key and the outputs of the AND circuit A21 are equivalent to the contents which correspond to the former key. Accordingly, the both inputs applied to the EXCLUSIVE-OR circuit E can not coincide with each other, so that the output of the EXCLUSIVE-OR circuit E is [1]. The signal [1] thus obtained at the output of the EXCLUSIVE-OR circuit E is fed to the flip-flop circuit F5 whereby the output of the latter becomes [1].

It is apparent from the foregoing descriptions that the flip-flop circuit F5 is a circuit for storing that the content stored in the register R2 is different from that of a newly depressed key.

The output line *r* is connected with the set input terminal of a flip-flop circuit F6, and in turn the set output terminal thereof is connected with one end of the individual input terminal of the AND circuits A22, A24 and with one input terminal of an OR circuit 06 through an inverter N.

The output of a flip-flop circuit F6 can become [1] after a certain period of time, which corresponds to the duration of one digit timing pulse, has elapsed upon receipt of a signal on the line *r*. Therefore, this flip-flop circuit F6 is employed for storing the contents that any one of the keys has been depressed. Read-out of the contents of the flip-flop circuit F6 is performed by a clock pulse 4cp which can be produced just before the termination of each timing signal T1 through T15.

The output line *r* is connected with another input terminal of the AND circuit A22. The output terminal of the AND circuit A22 is connected with the set input terminal of the flip-flop circuit F7 of which set output terminal is connected with the inhibit input terminal of the inhibit circuit G2.

In the arrangement, in the event that two or more keys are simultaneously operated in succession, a signal can be obtained by the depression of the former key on the line *r* and the flip-flop circuit F6 produces signal [1] as hereinbefore described. When the latter key is depressed, the signal corresponding to the latter key can be obtained at the line *r*, so that both inputs of the AND circuit A22 can be coincided with each other, whereby the AND circuit A22 produces an output [1] which sets the flip-flop circuit F7. Accordingly, the flip-flop circuit F7 is employed for storing the content that two or more keys have been depressed.

A reset signal SC which is produced just before the termination of the signal T15 as shown in FIG. 5 is adapted to be impressed upon the reset input terminal of the flip-flop circuits F5 through F7, whereby these flip-flop circuits F5 through F7 can be reset by the impression of the signal SC.

The output of the inhibit circuit G2 is connected with the input terminal of the OR circuit 06. The output terminal of the OR circuit 06 is connected with one input terminal of an AND circuit A23, and another input terminal of the AND circuit A23 is adapted to receive a termination signal EN which is generated upon completion of the transferring of the contents stored in the register R2 to the calculation circuit. The output terminal of the AND circuit A23 is connected with an inhibit input terminal of an inhibit circuit G3 through the delay circuit D of which delay time is determined by a few miliseconds. The delay circuit D is provided to prevent the influence such as the chattering, etc. The output of the AND circuit A24 and the output of the inhibit circuit G3 are applied through the OR circuit 05 to the input terminal of the flip-flop circuit Q1 included in a control signal generating circuit C which is arranged to produce the various control signals to reset the flip-flop circuits described hereinabove.

The control signal generating circuit C is composed of two flip-flop circuits Q1 and Q2 which are connected in series, inverter circuits N1 through N6 and matrix m2. Each symbol ● in the matrix circuit m2 represents the presence of MOS transistor as shown in the enlarged portion of FIG. 1*b*. The matrix circuit m2 is arranged so that a NAND circuit is constructed by these MOS transistors disposed on the same output line, for example, MOS transistors TR1 and TR2 disposed on the output line 31. Input lines 21 and 23 are connected with the output terminals of the flip-flop circuits Q1 and Q2, respectively. Input lines 22 and 24 are connected with the output terminals of said flip-flop circuits Q1 and Q2 through inverter circuits N1 and N2, respectively.

With these arrangement, the outputs of inverter N1 and N2 are adapted to be [1], in the event that both outputs of the flip-flop circuits Q1 and Q2 are [0], and in turn applied to the NAND circuit composed of MOS transistors TR1 and TR2 so that [0] signal can be obtained at the output line 31. Accordingly, the output of the inverter N3 or the signal SO is [1], since the [0] signal on the output line 31 is inverted by said inverter N3.

In the similar way as above mentioned, the output signal S1 is [1] when the conditions of the outputs of flip-flop circuits Q1 and Q2 are [1] and [0], respectively, the output S2 is [1] when the conditions are [1] and [1], and the output S3 is [1] when the conditions are [0] and [1].

The output terminal of the inverter N3 is connected with another input terminal of the AND circuit A24 so that the signal SO is applied to the AND circuit A24 to permit the passage of the signal from the flip-flop circuit F6 to the flip-flop circuit Q1. The output terminal of the inverter N4 is connected with the input terminal of the OR circuit 05, while the output terminal is connected with the third input terminals of the AND circuits A17 through A20 so that the signal S1 is applied to the AN circuits to permit the read-out of the signals stored in the register R2.

The output terminal of inverter N5 is connected with the input terminal of inhibit circuit G3 so that the signal S2 is adapted to be applied to the input terminal of the flip-flop Q1 through the OR circuit 05 to maintain the condition that the outputs of both flip-flop circuits Q1 and Q2 are [1] as hereinbefore described.

The output terminal of the inverter N6 is connected with the reset input terminals of the flip-flop circuits F1 through F4 so that the signal S3 is applied to reset these flip-flop circuits whereby the output signals can be allowed to pass the inhibit circuit G1 while the read-out operation of the contents of the register R2 is stopped.

The detailed construction of said flip-flop circuit Q1 or Q2 is shown in FIG. 4. The flip-flop circuit Q1 or Q2 comprises three transfer MOS transistors TR10, TR11 and TR12 and three storing MOS transistors TR13, TR14 and TR15. The first transfer MOS transistor TR10 receives the clock pulse SC generated at the end of the step pulse $\tau A$ as shown in FIG. 5, so that read-in of the input signal can be performed by the pulse SC. On the other hand, the third transfer MOS transistor TR12 receives the clock pulse Cp2, as shown in FIG. 5 , so that the output of the flip-flop circuit can be read out at intervals of the application of the clock pulses Cp2.

The operation of the present invention under the above mentioned construction will be described hereinafter.

When, for example, a character key associated with key switch K2 is depressed, the digit timing signal T2 is impressed onto the register R1 from the OR circuit 01 through the terminal P1. The output of the register R1 can be obtained after a certain period of time, which corresponds to the duration of one digit timing pulse, has elapsed upon receipt of the digit timing signal T2.

The output signal [1] of the register R1 is impressed upon the input terminal of each AND circuit A1 through A15 during the period of the digit timing signal T3. With the receipt of the signal [1] from the register R1, only the AND circuit A2 can produce a binary output [0010] because the digit timing signal T3 is applied to the third input terminal of the AND circuit A2.

However, it is noted that various binary coded signals produced from the matrix ml are fed to the second input terminal of each AND circuit A1 through A15, respectively.

The output [0010] of the AND circuit A2 is fed to the input terminal of the inhibit circuit G1 through the OR circuit 02. Since, at this time, the flip-flop circuit F1 is not set yet, the signal [1] is not impressed upon the inhibit input terminal of the inhibit circuit G1, so that the binary coded signal [0010] can be passed through said inhibit circuit G1 to the register R2 through the OR circuit 03. The signal thus fed to the register R2 can be stored in the register R2. The set output signal [1] of the flip-flop circuit F1 is obtained at the time that the content [0010] has been completely stored in the register R2 through the OR circuit 03. The signal thus fed to the register R2 can be stored in the register R2. The set output signal [1] of the fliflop circuit F1 is obtained at the time that the content [0010] has been completely stored in the register R2, which is in turn impressed upon the inhibit input terminal of the inhibit circuit G1 to prohibit the further transference of the signal from the OR circuit 02 to the OR circuit 03 therethrough. Since the set output signal [1] of the flip-flop circuit F1 is also adapted to be impressed upon the first terminal of the AND circuit A16, when the signal [1] is obtained at the output of the register R2, the AND circuit A16 can be triggered on to generate an output signal [1], which is returned to the input of the register R2 through the OR circuit 03. As a result, the content [0010] stored in the register R2 is circulated and stored until the flip-flop circuit F1 is reset. Thus, the content [0010], which identifies that the key K2 has been depressed, is stored in the register R2. On the other hand, the signal at the terminal P1 is also fed to the flip-flop circuit F2 to set the latter. Accordingly, even if the other key is subsequently depressed under this condition, the application of the binary coded signals corresponding to the character key that is depressed after the depression of the key K2 onto the register R2 is prohibited, since the inhibit signal is applied from the set output of flip-flop circuit F1 to the inhibit circuit G1.

When the command signal S1 generated from the command signal generating circuit C is impressed upon the AND circuits A17, A18, A19 and A20, the AND circuit A17 is, at first, triggered on at the timing T1 to transfer the content [0010] of the register R2 to the terminal LP through the OR circuit 04, whereby the signal showing that the second key in each key switch group 1, 2 and 3 has been depressed can be obtained. During the timing T2, the output f1 is [1], since the flip-flop circuit F2 is set as hereinbefore described. The AND circuit A18 can be triggered on so that the signal T2·t1, that is, [0001] is obtained at the terminal LP through the OR circuit 04. This content [0001] shows that a key which belongs to the first group among keyswitch groups 1, 2 and 3 has been depressed. Accordingly, a combination of the contents [0010] and [0001] obtained at the terminal LP at the timings T1 and T2, shows that the key of the key switch K2 has been depressed, and is transmitted to the calculation circuit (not shown). Thereafter, if the signal S3 is generated at a proper timing and the flip-flop circuits F1 and F2 are reset, whereby the inhibit signal at the inhibit circuit G1 disappears and the circuit G1 allows to pass the succeeding binary coded signals corresponding to the character key that has been depressed after the depression of said key K2.

If, for example, a key of the key switch L7 is depressed, lhe flip-flop circuit F3 is set in a similar manner as hereinbefore described with the flip-flop circuit F2, thereby to cause the output f2 to be [1]. On the other hand, the content [0111] is stored in the register R2 and circulated. Under this condition, no process takes place even if a new key is depressed while the command signal S3 is not impressed upon reset terminals of the flip-flop circuits F1 through F4. By the application of the signal S1 to the input of the AND circuit A17, the content [0111] is obtained at the terminal LP through the OR circuit 04, whereby the signal indicative of the depression of the seventh key in each key switch group is transferred to the calculation circuit.

Since the output f2 is [1] at the timing T2, the AND circuit A18 can be triggered on, whereby the T2·t2, that is, the content [0010] is obtained at the terminal LP through OR circuit 04. This signal indicative of the depression of a key which belongs to the second group among the key switch groups is then transferred to the calculation circuit. Namely, the contents [0111] and [0010] representative of the depression of the key switch L7 are transferred to the calculation circuit.

Following descriptions will be made to make apparent how the command signals S1 and S3 can be obtained.

When any key is not depressed, the signal [1] is not obtained at the output of the register R1, whereby the flip-flop circuit F6 is not set and the AND circuit A24 is not thus triggered on, thereby to cause the output to be [0].

In the initial condition of the operation, the output of the flip-flop circuits Q1 and Q2 are [0], respectively, so that the output SO is [1] and S1, S2 and S3 are [0]. Accordingly, the signal is not impressed upon the input of the command signal generating circuit C, whereby the control step S0′ that the command signal S0 is [1] can be held.

Subsequently, when a certain key, for example, the key of K2 is depressed, the register R1 is first set, and the set output thereof is applied through a line r to the set input terminal of the flip-flop circuit F6 at the timing T3, whereby the flip-flop circuit F6 is set. As the set output of the flip-flop circuit F6 is applied to the AND circuit A24 at the timing T4, the AND circuit A24 can be triggered on to cause the output to be [1], which is in turn applied to the flip-flop circuit Q1 through the OR circuit 05.

As a result, the outputs of the Q1 and Q2 become [1] and [0], respectively, and the command signal S1 is obtained at the output of the inverter circuit N4.

With this command signal S1 the content of the register R2 can be read out.

However, it is noted that there are sufficient periods to read in the content indicative of the depressed key into the register R2 since the flip-flop circuits Q1 and/or Q2 are set by the clock pulse SC which is produced at the end portion of the step pulse $\tau A$ as shown in FIG. 5.

Then, as the output [1] of the command signal S1 is applied to the flip-flop circuit Q1 through the OR circuit 05, the output of flip-flop circuits Q1 and Q2 become [1] and [1], and the output S2 becomes [1], thereby to shift the control step from S1′ to S2′.

If the key of the key switch K2 is at this time released, the control Step S2′ is held until the signal EN, which is adapted to appear at the end of an arithmetic operation as shown in FIG. 6 in the calculation circuit, appears.

As the termination signal EN is impressed, the signal [1] is impressed upon the other input of the AND circuit A23. On the other hand, as the flip-flop circuit F6 is reset by a signal SC generated at the end portion of the step pulse $\tau A$ as shown in FIG. 5 the output of the flip-flop circuit F6 becomes [0] and, thus, the [1] signal can be obtained at the output of the inverter NO through the inversion by the inverter N0. Since the signal [1] of the output of the inverter N0 is impressed upon the input of the AND circuit A23 through the OR circuit 06, the output of the AND circuit A23 becomes [1], thereby to apply the prohibition signal to the inhibit terminal of the inhibit of the inhibit circuit G3 through the delay circuit D.

As a result, the output of the inhibit circuit G3 becomes [0] and the output signal [0] is impressed upon the flip-flop circuit Q1 through the OR circuit 05, whereby the output of the flip-flop circuits Q1 and Q2 becomes [0] and [1], and the output S3 becomes [1], thereby to shift the control step from S2′ to S3′.

Accordingly, the flip-flop circuits F1 through F4 are reset by the command signal S3 and the inhibit circuit G1 allows to pass the signal indicative of the key which is depressed later.

If the key of the key switch K2 remains in the depressed position when the step S2 has been established, the flip-flop circuit F6 is still set, whereby the set output is [1] which is then inverted by the inverter N0 and, accordingly, the OR cicrcuit 06 receives the signal [0] from the inverter circuit N0.

The content [0010] is impressed upon the one input of the AND circuit A21 through the output line $q$, and the signal [1] is impressed upon the other terminal thereof through the output line $r$, whereby the content [0010] is impressed upon the other terminal of the input of the EXCLUSIVE-OR circuit E at the timing T3, and the content [0010] is impressed upon the one input thereof through the output line $p$ at the timing thereof. Accordingly, both these inputs are the same, whereby the output of the EXCLUSIVE-OR circuit E is [0].

Thus, as the flip-flop circuit F5 is not set, the set output becomes [0], whereby the signal is not impressed upon the input terminal of the inhibit circuit G2, and the signal [1] is not obtained even at the other input terminal of the OR circuit 06. Accordingly, the signal [1] is not obtained even at the output of the AND circuit A23, whereby the prohibition signal is not applied to the inhibit terminal of the inhibit circuit G3. The signal [1] of the command signal S2 is impressed upon the flip-flop circuit Q1 through the inhibit circuit G3 and the OR circuit 05. Accordingly, the control step S2 is held till the inhibit circuit prohibits the passage of signal by application of the inhibit signal corresponding to the releasing of key of the key switch K2 as hereinbefore described.

The operation of the input device according to the present invention in the event that two keys are successively operated in an overlapped manner in which condition, for examples, during the closing of the key switch K2, the key switch K7 is closed and, thereafter, the key switch K7 that has been closed is released before the key switch K2 is released will be described with reference to FIG. 6.

When the key of the key switch K2 is first depressed, the content [0010] is stored in the register R2, while the signal on the line r appears at the timing T3 and the control step shifts from S0′ to S1′, and the content [0010] is fed to the calculation circuit as hereinbefore described. After the duration of the time of the step pulse $\tau A$, the control step S1′ shifts to S2′.

If the key of the key switch K7 is depressed, while the key of the key switch K2 remains in the depressed position, two signals equivalent to the digit timing pulses T2 and T7 appear at the output terminal of the OR circuit 01.

When the signal of the digit timing pulse T3 appears on the line *r*, the AND circuit A21 allows to pass through the content [0010] stored in the register R2 to the EXCLUSIVE-OR circuit E. In the mean time the content [0111] indicative of the key switch K7 is fed to the EXCLUSIVE-OR circuit E so that the circuit E produces [1], thereby to set the flip-flop circuit F5. On the other hand, the AND circuit A22 produces the output [1] by the both signals fed from line r and output of the flip-flop circuit F6 and, in turn, sets the flip-flop circuit F7 of which output [1] causes the inhibit circuit into the prohibit condition.

Therefore, the command signal S2 can be fed to the input of the flip-flop circuit Q1, whereby the control step can be held at the S2', so that the flip-flop circuit F1 holds the set output.

Accordingly, the inhibit condition of the inhibit circuit G1 is held, so that the content [0111] indicative of the depression of key switch K7 is not fed to the register R2.

In addition, so far as the control step S2' continues, even if the key of the key switch K7 is depressed several times while the key of the key switch K2 has been in the depressed position, reapplication of the content [0010] to the calculation circuit in response to the successive releasing of the key switch K7 can be prevented since the signal S1 is not applied to each input terminal of AND circuit A17 through A20.

If the key of the key switch K7 is depressed while the key of the switch K2 has been in the depressed position and, then, the key of the key switch K2 is released, the content [0010], which shows the depression of the key of the switch K2, is stored in the register R2.

And the flip-flop circuit F6 is set at the timing T4.

The set output [1] of the flip-flop circuit F6 is impressed upon the input terminal of the AND circuit A22.

On the other hand, as the signal [1] is impressed upon the other input terminal of the AND circuit A22 through the output line *r* at the timings T3 and T8, the output of the AND circuit A22 becomes [1] at the timing T4, which is impressed upon the set input of the flip-flop circuit F7 to set the flip-flop circuit F7.

As the prohibit signal is applied to the inhibit circuit G2 by the set output of the flip-flop circuit F7, the signal [1] is not obtained at the output of the inhibit circuit G2 if the signal [1] is impressed upon the inhibit input terminal of the inhibit circuit G2 from the flip-flop circuit F5.

Consequently, the prohibition signal is not applied to the inhibit circuit G3 to cause it to hold at the control step S2.

However, only the digit timing signal T7 indicative of the depression of the key switch K7 can be obtained at the terminal P1 after the key of the key switch K2 has been released, whereby the output of the register R1 becomes [1] at the timing T8.

The signal [1] of the output of the register R1 is impressed upon the set input terminal of the flip-flop circuit F6 and the input terminal of the AND circuit A22 through the output line *r*.

The output of the flip-flop circuit F6 can become [1] after a certain period of time, which corresponds to the duration of one digit timing pulse, has elapsed upon receipt of a signal fed from the line *r*.

However, the flip-flop circuit F6 is reset just before the termination of the digit timing signal, so that both inputs of AND circuit A22 do not coincide with each other and, in turn, the output is [0]. Accordingly, the flip-flop circuit F7 is not set, and the set output is [0], by which [0] output the prohibition of the inhibit circuit G2 is released.

The signal obtained at the one input terminal of the EXCLUSIVE-OR circuit E through the output line *p* is [0111] which is the content of the register R2.

The signal obtained at the input terminal of the EXCLUSIVE-OR circuit E through the AND circuit A21 by means of the output line *q* is [0010].

Accordingly, the inputs of the EXCLUSIVE-OR circuit E do not coincide with each other, whereby the output thereof becomes [1] which is in turn applied to the flip-flop circuit F5 to set the latter.

As the set output signal [1] is impressed upon the input end of the inhibit circuit G2, the signal [1] is obtained at the output of the inhibit circuit G2. The signal [1] is then impressed upon one end of the input of the AND circuit A23 through the OR circuit 06. As a result, when the termination signal EN is impressed upon the other end of the input of the AND circuit A23 from the calculation circuit, the AND circuit A23 can be triggered on to generate an output signal [1].

As this output signal [1] is then impressed upon the inhibit input terminal of the inhibit circuit G3 through the delay circuit D, the output of the inhibit circuit G3 becomes [0] which is in turn applied to the flip-flop circuit Q1 through the OR circuit 05. Consequently, the output of the flip-flop circuits Q1 and Q2 become [0] and [1], respectively, and the output S3 become [1]. Namely, the control step shifts from S2' to S3'.

The flip-flop circuits F1 and F2 are reset by the output signal S3 to clear the prohibition of the inhibit circuit G1 to permit the register R2 to store therein the signal [0111] indicative of depression of the key of the key switch K7. The subsequent operation takes place in the same manner as when the single key has been depressed.

The flow chart shown in FIG. 2 illustrates the transit of the control steps S0', S1', S2' and S3' in response to the depression of any one of the key on the keyboard.

Referring to FIG. 2, characters S0', S1', S2' and S3' designate the respective control steps, and characters AK, ASK and SM designate the states of the flip-flop circuits F6, F7 and F5, respectively. The terms "Yes" and "No" employed in this figure designate as follows:

In AK: "No" means the low level signal [0] and "Yes" means the high level signal [1];

In ASK: "No" means the high level signal [1] and "Yes" means the low level signal "0];

In SM: "No" means the high level signal [1], indicating an information that a signal representative of the depression of a key differs from the content of the register R2, and "Yes" means the low level signal [0].

The term "END" designates the presence or absence of the termination signal EN and the character D indicates the delay circuit.

By way of example, in the event that the state of AK is "N," this means that no key has been depressed and, therefore, the control step S0' is held. Alternatively, if the state of AK is "Yes," this means that any one of the keys on the keyboard has been depressed and, therefore, the control step S0' changes to the control step S1'.

In the above description, the key switch is employed as a plurality of input sources, but the present invention may be also used as a circuit arrangement wherein one signal is selected from a plurality of signal sources, stored and transmitted to the calculation circuit at a required time, the other input being prohibited until the order from the calculation circuit is provided.

The present invention has the following advantages in which:

As the earliest input signal is stored in a serial type shift register and the subsequent input is prohibited for self-circulation, the signal can be taken out any time the calculation circuit requires. In addition, the employment of the serial type shift register permits the circuit construction to be highly simple, since the register is satisfactory with one unit of small bits, no matter how many the input signal sources may be.

Although the present invention has been fully described by way of example in connection with the preferred embodiment thereof, it is to be noted that various modifications and changes are apparent to those skilled in the art. For example, although the present invention has been described as operatively associated with an electronic calculator, it may be operatively associated with a computer, register or the like electronic apparatus. Therefore, the present invention is not limited thereby, such changes and modification being construed as included therein unless otherwise the latter does not depart from the scope of the present invention.

What is claimed is:

1. An input device for use in an electronic apparatus which comprises means for selecting in succession a signal out of a plurality of input signals from the corresponding number of signal sources, storing means including a shift register of serial type for storing the signal which has been selected by said selecting means, first gating means operable so as to feed said selected signal to said storing means and inhibit the passage of the subsequently selected signal therethrough to said storing means after said selected signal has been stored by said storing means, and second gating means operable so as to read out the signal stored in said storing means and then to feed it to the following stage, whereby the content stored in said register can be fed to said following stage at any time when said following stage requires, while the inhibition of the passage of said subsequently selected signal through said first gating means is released upon transference of said content to said following stage in response to a command signal.

2. An input device for use in an electronic apparatus which comprises a group of key switches associated with a plurality of keys disposed on a keyboard, first ends of said key switches being adapted to receive respective timing signals generated in different timings while second ends of said key switches being connected with a common junction from which a signal indicative of depression of any one of said keys emerges, means operable upon receipt of said signal from said common junction to generate a signal identifying the key depressed at the relevant timing, means including a serial type shift register for storing said identifying signal, means for feeding said identifying signal from said first mentioned means to said shift register and for inhibiting the passage of a subsequent signal identifying a subsequently depressed key after said identifying signal has been completely stored in said shift register, means for reading out the signal stored in said shift register and then feeding it to the following stage, first storing means for storing an information that a key different from that signified by the content of said shift register has been depressed, second storing means for storing an information that any one of said keys has been depressed, third storing means for storing an information that the number of keys depressed is not one and means for generating command signals in response to the logical output of said first to third storing means whereby said third mentioned means and said fourth mentioned means can be respectively operated so as to read out the content of said shift register and to release the inhibition.

3. An input device for use in an electronic apparatus which comprises a plurality of groups of key switches associated with a plurality of keys disposed on a keyboard, first ends of said key switches of each group being adapted to receive respective timing signals generated in different timings while second ends of said key switches of each group being connected with a common junction from which a signal indicative of depression of any one of said keys emerges, means operable upon receipt of signals from said common junctions to generate a signal identifying the key depressed at the relevant timing, means operable upon receipt of a signal indicative of depression of any one of the keys of said groups from any one of said common junction for storing an information that a key of a specific one of said groups has been depressed, means including a serial type shift register for storing said identifying signal, means for feeding said identifying signal from said first mentioned means to said shift register and for inhibiting the passage of a subsequent signal identifying a subsequently depressed key after said identifying signal has been completely stored in said shift register, first feeding means for reading out the signal stored in said shift register and then feeding it to the following stage, second feeding means for feeding to said following stage together with said identifying signal from said first feeding means a signal identifying the group to which said depressed key belongs, first storing means for storing an information that a key different from that signified by the content of said shift register has been depressed, second storing means for storing an information that any one of said keys has been depressed, third storing means for storing an information that the number of keys depressed is not one and means for generating command signals in response to the logical product of said first to third storing means whereby said fourth mentioned means and said first and second feeding means can be respectively operated so as to read out the content of said shift register and to release the inhibition.

4. An input device according to claim 1, wherein said signal sources provide an output signal in the form of a serial bit stream for application to said serial shift register.

5. An input device according to claim 1, wherein said selecting means includes a keyboard arrangement having selectable keys, and encoder means including said signal sources for providing a serieal bit stream output signal corresponding to a selected key for application to said serial shift register.

* * * * *